(12) United States Patent
Duan et al.

(10) Patent No.: US 12,140,268 B1
(45) Date of Patent: Nov. 12, 2024

(54) DISPLAY SCREEN DEVICE

(71) Applicant: SHENZHEN CLT ELECTRONICS CO., LTD, Shenzhen (CN)

(72) Inventors: Sicai Duan, Shenzhen (CN); Jie Huang, Shenzhen (CN); Yong Li, Shenzhen (CN); Li Peng, Shenzhen (CN)

(73) Assignee: SHENZHEN CLT ELECTRONICS CO., LTD, Shenzhen (CN)

( * ) Notice: Subject to any disclaimer, the term of this patent is extended or adjusted under 35 U.S.C. 154(b) by 0 days.

(21) Appl. No.: 18/452,700

(22) Filed: Aug. 21, 2023

(51) Int. Cl.
*F16M 11/00* (2006.01)
*F16M 11/04* (2006.01)
*F16M 11/18* (2006.01)
*G01L 1/16* (2006.01)
*G01L 5/00* (2006.01)

(52) U.S. Cl.
CPC .......... *F16M 11/046* (2013.01); *F16M 11/18* (2013.01); *G01L 1/16* (2013.01); *G01L 5/0052* (2013.01)

(58) Field of Classification Search
CPC ........ F16M 11/046; F16M 11/18; G01L 1/16; G01L 5/0052
See application file for complete search history.

(56) References Cited

U.S. PATENT DOCUMENTS

2020/0363705 A1* 11/2020 Lai .......................... G01B 21/16

FOREIGN PATENT DOCUMENTS

CN           217333573 U     8/2022

* cited by examiner

*Primary Examiner* — Amy J. Sterling
(74) *Attorney, Agent, or Firm* — Westbridge IP LLC

(57) ABSTRACT

Disclosed is a display screen device. The display screen device includes a lifting structure, a display screen, a main control unit, a driving unit, a power supply unit, and an anti-collision unit. The display screen is fixed to the lifting structure. The main control unit is electrically connected to the display screen. The driving unit is electrically connected to the main control unit and configured to drive the lifting structure. The power supply unit is configured to supply power to the display screen, the main control unit, and the driving unit. The anti-collision unit is provided in the lifting structure and electrically connected to the main control unit, and the anti-collision unit is configured to detect an impact happening to the lifting structure when the lifting structure is lifting or lowering.

8 Claims, 7 Drawing Sheets

DISPLAY SCREEN DEVICE

TECHNICAL FIELD

The present application relates to the technical field of display screen, particularly to a display screen device.

BACKGROUND

The display screen device is widely used in our daily life. However, since the conventional large-size light-emitting diode display (LED) screen is bulky and heavy, it is difficult to lift, lower, or move the display screen, and even in some cases, the display screen cannot stop moving in time when it gets blocked by obstacles, which will easily cause damage to the display screen itself and its lifting support.

In addition, the conventional LED screen requires an external power supply to work properly, while the electric lifting system requires another external power supply, and operating two sets of external power supplies is way more complex and inconvenient.

SUMMARY

The present application aims to solve at least one technical problem existing in the related art. To achieve this purpose, the present application provides a display screen device, which solves the technical problem that the lifting structure in the display screen cannot stop moving in time when it gets blocked by obstacles.

In order to achieve the above objective, the present application provides a display screen device, including a lifting structure, a display screen, a main control unit, a driving unit, a power supply unit, and an anti-collision unit. The display screen is fixed to the lifting structure. The main control unit is electrically connected to the display screen. The driving unit is electrically connected to the main control unit and configured to drive the lifting structure. The power supply unit is configured to supply power to the display screen, the main control unit, and the driving unit. The anti-collision unit is provided in the lifting structure and electrically connected to the main control unit, and the anti-collision unit is configured to detect an impact happening to the lifting structure when the lifting structure is lifting or lowering.

The display screen device according to the above embodiment of the present application has at least the following technical effects: the power supply unit supplies power to the main control unit, the driving unit, and the display screen to make the entire system start running. The driving unit is connected to the lifting structure, and the driving unit drives the lifting structure for lifting or lowering. The main control unit is electrically connected to the anti-collision unit, which enables the lifting structure to be monitored in real time when the driving unit drives the lifting structure for lifting or lowering, and enables the lifting structure to work normally and effectively prevents a collision between the lifting structure and obstacles. The lifting structure is stable and reliable, the operation system is simple and in control, the service life of the display screen is ensured, the combination for use of the lifting structure and each of the functional units makes it easy and convenient to use, control, and move the display screen device.

According to some embodiments of the present application, the display screen device further includes a wireless communication unit electrically connected to the main control unit.

According to some embodiments of the present application, the wireless communication unit includes a Bluetooth module or a WIFI module.

According to some embodiments of the present application, the anti-collision unit is a piezoelectric sensor.

According to some embodiments of the present application, the display screen device further includes a control panel provided on the lifting structure and electrically connected to the main control unit.

According to some embodiments of the present application, the lifting structure includes a base, two supporting members, and two lifting members. The two supporting members are connected to the base, and both of the two supporting members are provided with accommodating cavities. The two lifting members are connected to the driving unit, the driving unit is configured to drive the two lifting members to move along a direction in which the accommodating cavity is extended, the two lifting members are configured to fix the display screen, and the anti-collision unit is provided on the lifting member.

According to some embodiments of the present application, the supporting member includes a first supporting part and a second supporting part. The lifting member moves in the accommodating cavity defined by the first supporting part and the second supporting part.

According to some embodiments of the present application, the display screen device includes two anti-collision units, and the two anti-collision units are provided on the two lifting members.

The additional aspects and advantages of the present application will be partly given in the following descriptions, and some will become apparent from the following descriptions or become known through the practice of the present application.

BRIEF DESCRIPTION OF THE DRAWINGS

The above or additional aspects and advantages of the present application will be apparent and easy to understand from the descriptions of the embodiments combining the following drawings, in which.

DETAILED DESCRIPTION OF THE EMBODIMENTS

Figure 1:
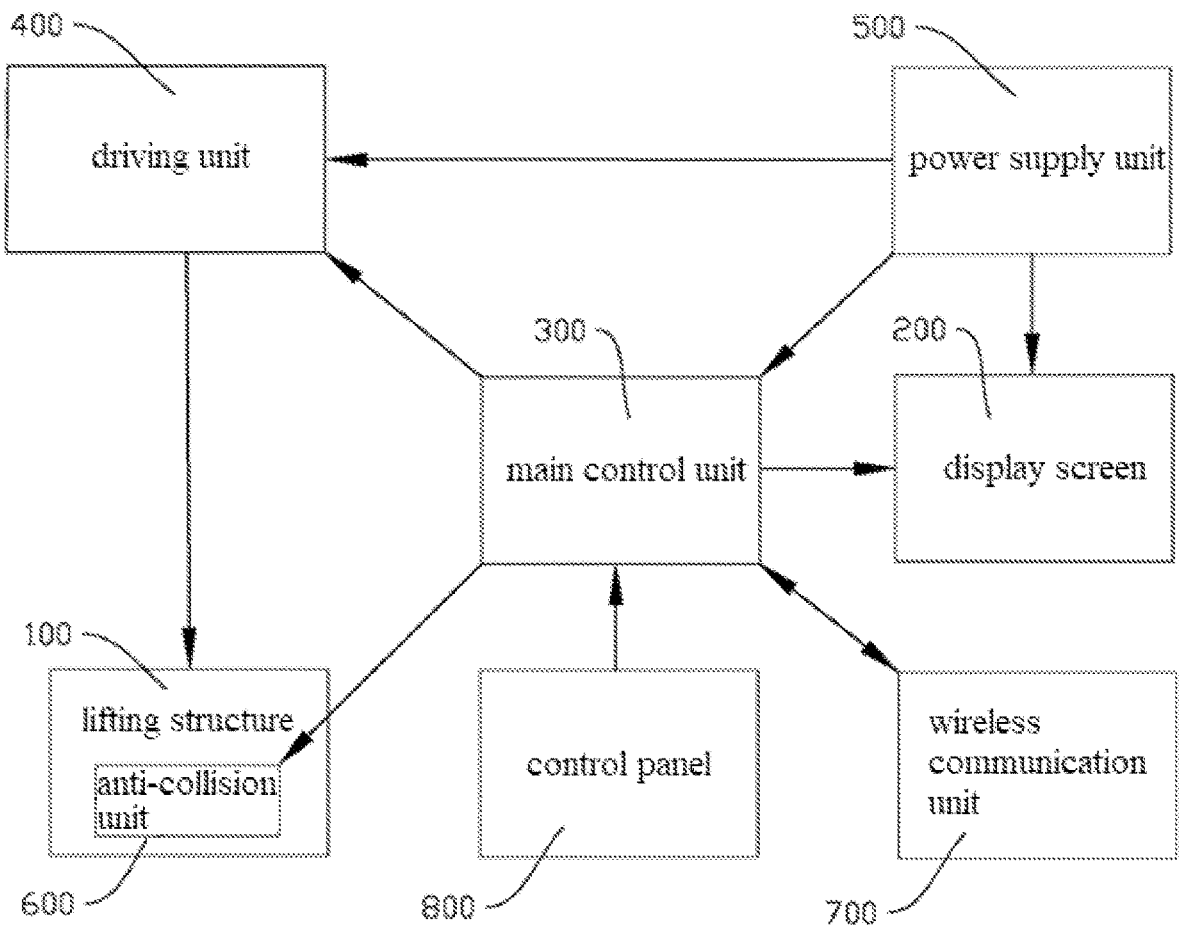
FIG. 1 is an electrical system block diagram of a display screen device according to an embodiment of the present application.

The embodiments of the present application are described in detail below, and examples of the embodiments are shown in the drawings, and the same or similar reference numbers are to represent the same or similar elements or the elements that have same or similar functions. The embodiments described below by reference to the drawings are exemplary, and are intended only to explain the present application and cannot be understood as limitations of the present application.

It should be understood that, in the descriptions of the present application, all the directional indications, such as up, down, front, rear, left, right, etc., are intended only to facilitate the descriptions of the present application and to simplify the descriptions, and are not to indicate or imply that the referred devices or elements must have a particular orientation, be constructed and operated with a particular orientation, and therefore cannot be understood as limitations of the present application.

In the descriptions of the present application, "a number of" is understood to mean one or more, "a plurality of" is understood to mean more than two, "greater than", "less than", and "more than" are understood to exclude the present number, "no less than", "no more than" are understood to include the present number. If there are descriptions of "first" and "second", they are only used for the purpose of distinguishing the referred technical features, and cannot be understood as indicating or implying the relative importance or implicitly indicating the number of the referred technical features or the sequential relationship of the referred technical features.

In the descriptions of the present application, unless otherwise specifically limited, the terms such as "set", "install", "connect" and the like should be understood in a broad sense, those skilled in the art may reasonably determine the specific meaning of the above terms in the present application in combination with the specific content of the technical solutions.

A display screen device according to an embodiment of the present application is described below with reference to FIGS. 1 to 7.

In an embodiment, the display screen device includes a lifting structure 100, a display screen 200, a main control unit 300, a driving unit 400, a power supply unit 500, and an anti-collision unit 600. The display screen 200 is fixed to the lifting structure 100. The main control unit 300 is electrically connected to the display screen 200. The driving unit 400 is electrically connected to the main control unit 300 and configured to drive the lifting structure 100. The power supply unit 500 is configured to supply power to the display screen 200, the main control unit 300, and the driving unit 400. The anti-collision unit 600 is provided in the lifting structure 100 and electrically connected to the main control unit 300, and the anti-collision unit 600 is configured to detect an impact happening to the lifting structure 100 when the lifting structure 100 is lifting or lowering.

Figure 2:
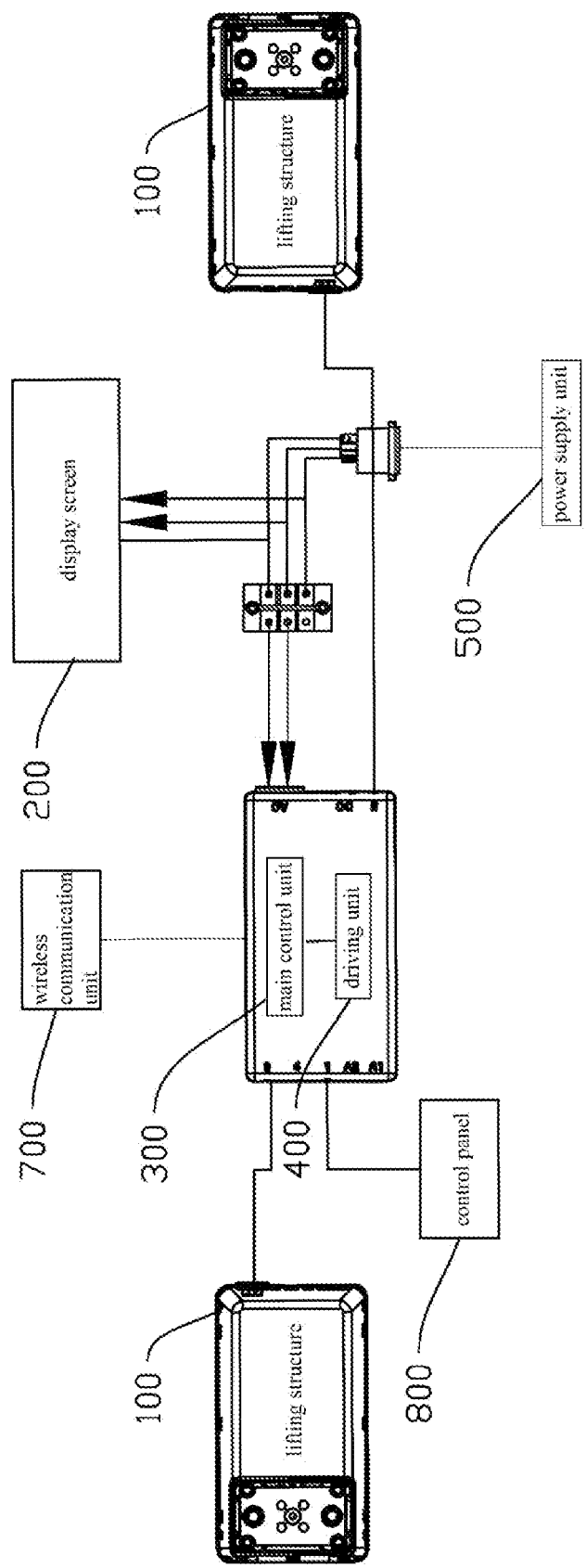
FIG. 2 is a schematic view showing an electrical structure of a display screen device according to an embodiment of the present application.
Figure 3:
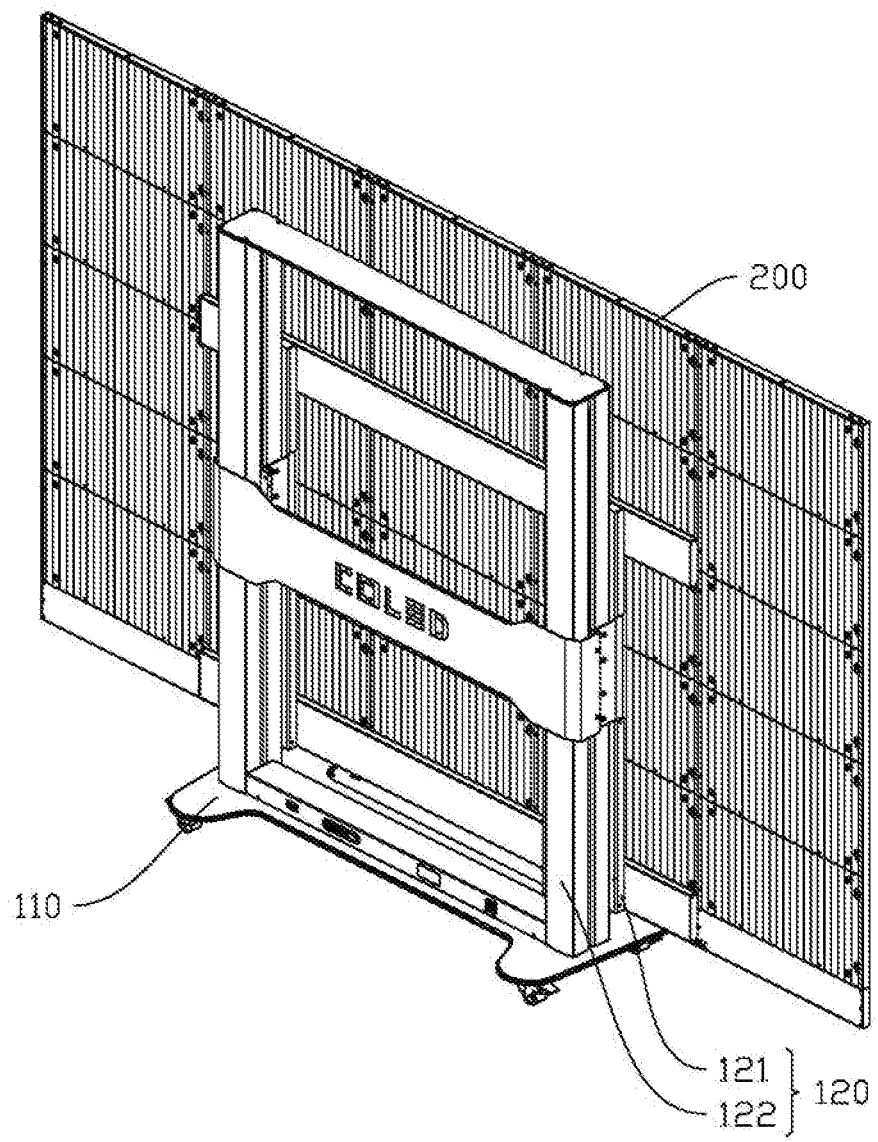
FIG. 3 is a schematic structural view of a display screen device according to an embodiment of the present application.

As shown in FIGS. 1 to 3, the display screen 200 is provided on the lifting structure 100, the main control unit 300 is electrically connected to the display screen 200, the driving unit 400 drives the lifting structure 100 to lift or lower. The entire display screen device is powered by one power supply unit 500, this is to say, the power system of the display screen 200 and the power system for controlling the lifting structure 100 are combined into one, therefore only one power cable is required for power supply, and when the power supply unit 500 is powered on, not only the display screen 200 can be power on, but also the lifting structure 100 can be controlled to lift or lower.

The anti-collision unit 600 is provided in the lifting structure 100, and the anti-collision unit 600 is electrically connected to the main control unit 300. During the lifting process or the lowering process of the lifting structure 100, when the lifting structure 100 is blocked by an obstacle, the load that the anti-collision unit 600 suffers will be suddenly changed, and when the value of the change reaches a certain size, the main control unit 300 controls the driving unit 400 to drive the lifting structure 100 to stop moving in a previous direction and retract a corresponding distance. It should be noted that, the range of the load detected in this embodiment is from 14 kg to 18 kg, and the range can be adjusted according to a specific situation, there is no limit here. It should also be noted that, the distance that the lifting structure 100 retracts ranges from 0 to 40 mm in this embodiment, and the distance can be adjusted according to a specific situation, there is also no limit in the present application.

In the above embodiment, the power supply unit 500 supplies power to the main control unit 300, the driving unit 400, and the display screen 200 to make the entire system start running. The driving unit 400 is connected to the lifting structure 100, and the driving unit 400 drives the lifting structure 100 for lifting or lowering. The main control unit 300 is electrically connected to the anti-collision unit 600, which enables the lifting structure 100 to be monitored in real time when the driving unit 400 drives the lifting structure 100 for lifting or lowering, and enables the lifting structure 100 to work normally and effectively prevents a collision between the lifting structure 100 and obstacles. The lifting structure 100 is stable and reliable, the operation system is simple and in control, the service life of the display screen 200 is ensured, the combination for use of the lifting structure 100 and each of the functional units makes it easy and convenient to use, control, and move the display screen device.

In some embodiments of the present application, the display screen device further includes a wireless communication unit 700 electrically connected to the main control unit 300. The wireless communication unit 700 communicates with the main control unit 300 for data transmission, and the wireless communication unit 700 can also communicate with external devices for data exchanges, so as to realize a remote control of the lifting or lowering the lifting structure 100, which is simple to operate.

In some embodiments of the present application, the wireless communication unit 700 includes a Bluetooth module or a WIFI module. In this embodiment, the wireless communication unit 700 is set as the Bluetooth module or the WIFI module, and the corresponding external device is a Bluetooth remote controller or an APP on a mobile terminal. The wireless communication could also be set as an infrared module, and the corresponding external device is an infrared remote controller.

In some embodiments of the present application, the anti-collision unit 600 is a piezoelectric sensor. The piezoelectric sensor works based on the piezoelectric effect, it converts the pressure to be determined into electrical signal, so as to transmit data with the main control unit 300, play a role in detecting the size of the load, and effectively prevent damage to the display screen device that may be triggered by the obstacles blocking the lifting structure 100 in the lifting process.

Figure 4:
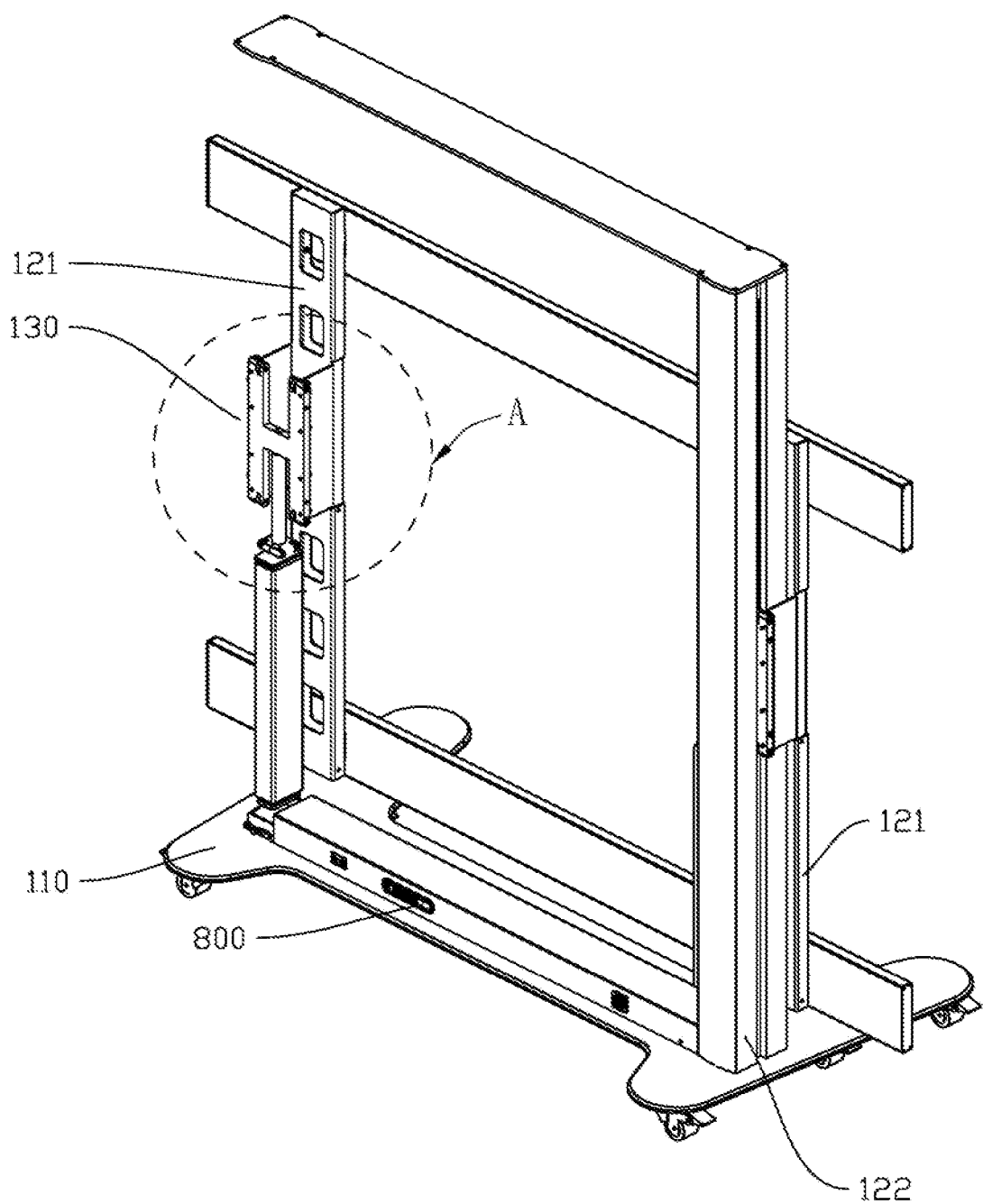
FIG. 4 is a schematic structural view of a lifting structure according to an embodiment of the present application.

In some embodiments of the present application, the display screen device further includes a control panel 800 provided on the lifting structure 100 and electrically connected to the main control unit 300. As shown in FIG. 4, in addition to controlling the lifting structure 100 in a remote manner, the control panel 800 is provided in this embodiment. The control panel 800 is electrically connected to the main control unit 300 and transmits data with the main control unit 300, and the effect of controlling the lifting structure 100 is also achieved, which ensures that the display screen 200 can still work normally when the wireless communication unit 700 malfunctions.

In some embodiments of the present application, the lifting structure 100 includes a base 110, two supporting members 120, and two lifting members 130. The two supporting members 120 are connected to the base 110, and both of the two supporting members 120 are provided with accommodating cavities. The two lifting members 130 are connected to the driving unit 400, the driving unit 400 is configured to drive the two lifting members 130 to move along a direction in which the accommodating cavity is extended, the two lifting members 130 are configured to fix the display screen 200, and the anti-collision unit 600 is provided on the lifting member 130.

Figure 5:
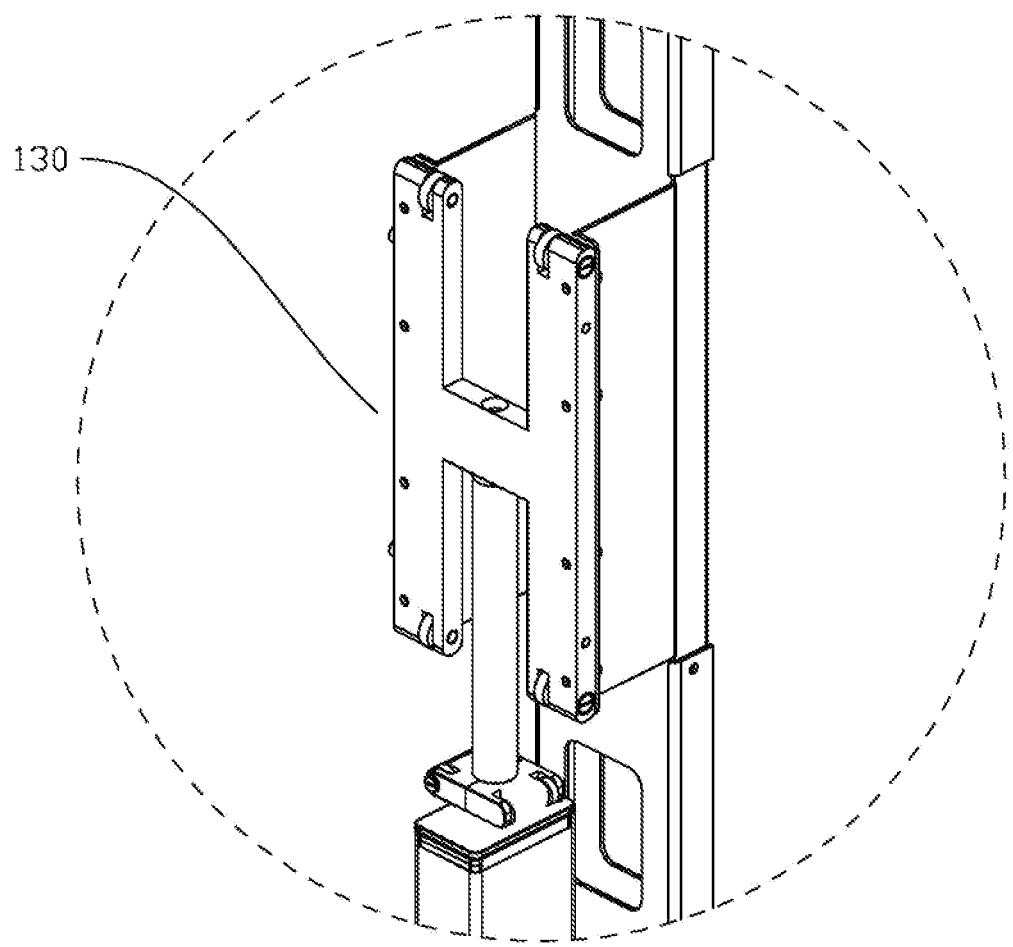
FIG. 5 is an enlarged schematic view of part A in FIG. 4.
Figure 6:
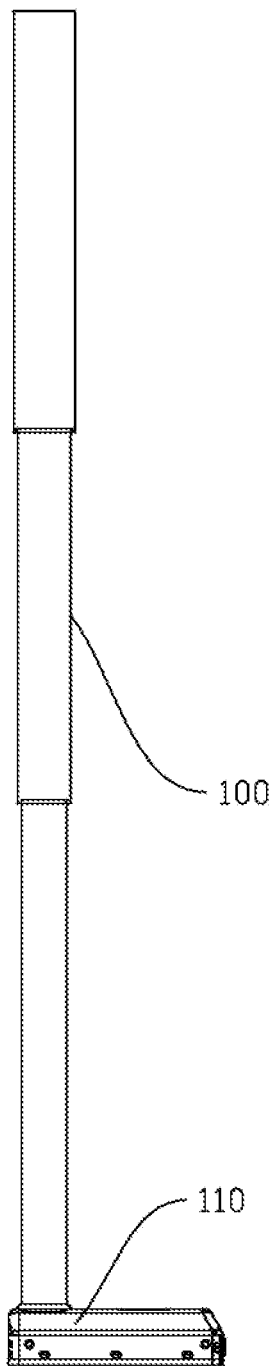
FIG. 6 is a schematic structural view of a lifting structure in a lifted state according to an embodiment of the present application.
Figure 7:
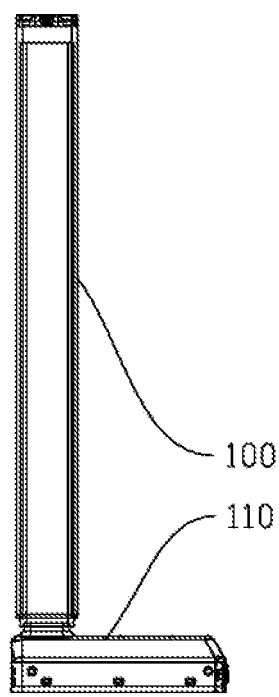
FIG. 7 is a schematic structural view of a lifting structure in a lowered state according to an embodiment of the present application.

As shown in FIGS. 3 to 7, the control panel 800 is provided on the base 110, and the base 110 is used to support the weight of the entire device. The two supporting members 120 are connected to the base 110, and the accommodating cavity provided in the supporting member 120 provides space for the upward and downward movement of the lifting member 130. The driving unit 400 is provided inside the supporting member 120, and the lifting member 130 is used to fix the display screen 200, then the height of the display screen 200 can be adjusted by adjusting the lifting structure 100. The anti-collision unit 600 is provided on the lifting member 130 to detect the load change in real time following the movement of the lifting member 130 and the display screen 200. As shown in FIG. 6, which shows the state in which the lifting structure 100 is lifted to a highest position, and refer to FIG. 7, which shows the state in which the lifting structure 100 is lowered to a lowest position.

In some embodiments of the present application, the supporting member 120 includes a first supporting part 121 and a second supporting part 122. The lifting member 130 moves in the accommodating cavity defined by the first supporting part 121 and the second supporting part 122. As shown in FIG. 4 and FIG. 5, the supporting member 120 includes the first supporting part 121 and the second supporting part 122 corresponding to one lifting member 130. The lifting member 130 includes one first rod and two second rods, which are arranged into an "H" like structure, making the structure of the lifting member 130 more stable. In addition, the anti-collision unit 600 could be provided on any one of the two lifting members 130.

In some embodiments of the present application, as shown in FIG. 4 and FIG. 5, the lifting movement and the lowering movement of the lifting members 130 could be realized by the telescopic action of the piston rod driven by a cylinder or an oil cylinder. Other possible driving methods can be adopted to replace the cylinder or the oil cylinder in this embodiment, as long as the same effect is realized.

In some embodiments of the present application, the display screen device includes two anti-collision units 600, and the two anti-collision units 600 are provided on the two lifting members 130. The anti-collision units 600 are provided in two, and each of the two lifting members 130 is provided with one anti-collision unit 600, which facilitates the accuracy of determining whether there is an obstacle. The number and the position of the anti-collision unit 600 are not limited in the present application, as long as it is reasonably configured and the same effect is realized.

In the descriptions of the present application, reference terms such as "one embodiment", "some embodiments", "exemplary embodiment", "example", "specific example", or "some examples", etc. are intended to indicate that the specific features, structures, materials or characteristics that are described in combination with the present embodiment or example are included in at least one embodiment or example of the present application. In the present application, the above reference terms do not indicate that they refer to the same embodiments or examples. Further, the specific features, structures, materials or characteristics that are described may be combined in any appropriate manner in any one or more embodiments or examples.

Although some embodiments of the present application are described in detail combining with drawings, the present application is not limited to the above embodiments. What can be understood by those skilled in the art is that, these embodiments may be varied, replaced and modified in a number of ways without departing from the principles and purpose of the present application, and that the scope of the present application is limited by the claims and their equivalents.

What is claimed is:

1. A display screen device, comprising:
   a lifting structure;
   a display screen fixed to the lifting structure;
   a main control unit electrically connected to the display screen;
   a driving unit electrically connected to the main control unit, the driving unit being configured to drive the lifting structure;
   a power supply unit configured to supply power to the display screen, the main control unit, and the driving unit; and
   an anti-collision unit provided in the lifting structure and electrically connected to the main control unit, the anti-collision unit being configured to detect an impact happening to the lifting structure when the lifting structure is lifting or lowering.

2. The display screen device according to claim 1, further comprising:
   a wireless communication unit electrically connected to the main control unit.

3. The display screen device according to claim 2, wherein the wireless communication unit comprises a Bluetooth module or a WIFI module.

4. The display screen device according to claim 1, wherein the anti-collision unit is a piezoelectric sensor.

5. The display screen device according to claim 1, further comprising:
   a control panel provided on the lifting structure and electrically connected to the main control unit.

6. The display screen device according to claim 1, wherein the lifting structure comprises:
   a base;
   two supporting members connected to the base, both of the two supporting members being provided with accommodating cavities; and
   two lifting members connected to the driving unit,
   wherein the driving unit is configured to drive the two lifting members to move along a direction in which the accommodating cavity is extended, the two lifting members are configured to fix the display screen, and the anti-collision unit is provided on the lifting member.

7. The display screen device according to claim 6, wherein the supporting member comprises a first supporting part and a second supporting part, the lifting member moves in the accommodating cavity defined by the first supporting part and the second supporting part.

8. The display screen device according to claim 7, wherein the display screen device comprises two anti-collision units, and the two anti-collision units are provided on the two lifting members, respectively.

\* \* \* \* \*